(12) United States Patent
Knudsen

(10) Patent No.: US 12,160,500 B2
(45) Date of Patent: Dec. 3, 2024

(54) METHODS AND DEVICES FOR SECURE DATA COMMUNICATION

(71) Applicant: Dencrypt A/S, Hvidovre (DK)

(72) Inventor: Lars Ramkilde Knudsen, Hvidovre (DK)

(73) Assignee: Dencrypt A/S, Hvidovre (DK)

( * ) Notice: Subject to any disclaimer, the term of this patent is extended or adjusted under 35 U.S.C. 154(b) by 291 days.

(21) Appl. No.: 17/642,521

(22) PCT Filed: Sep. 11, 2020

(86) PCT No.: PCT/EP2020/075457
§ 371 (c)(1),
(2) Date: Mar. 11, 2022

(87) PCT Pub. No.: WO2021/048341
PCT Pub. Date: Mar. 18, 2021

(65) Prior Publication Data
US 2022/0337396 A1    Oct. 20, 2022

(30) Foreign Application Priority Data
Sep. 13, 2019   (EP) ..................................... 19197344

(51) Int. Cl.
*H04L 9/06* (2006.01)
*H04L 9/08* (2006.01)

(52) U.S. Cl.
CPC .......... *H04L 9/0631* (2013.01); *H04L 9/0822* (2013.01); *H04L 9/0841* (2013.01); *H04L 9/0891* (2013.01)

(58) Field of Classification Search
CPC ... H04L 9/0631; H04L 9/0822; H04L 9/0841; H04L 9/0891; H04L 63/061; H04L 63/068; H04W 12/041
See application file for complete search history.

(56) References Cited

U.S. PATENT DOCUMENTS 10,320,554 B1 * 6/2019 Pedersen ................. H04L 9/003
10,341,102 B2 * 7/2019 Bowman .................. H04L 9/14
(Continued)

FOREIGN PATENT DOCUMENTS

EP    3291481    3/2018
EP    3334189    6/2018
(Continued)

OTHER PUBLICATIONS

Blocki J et al: "CASH: A cost assymmetric secure Hash algorithm . . . ", 2016 IEEE 29th Computer Security Foundations Symposium, 2016.
(Continued)

*Primary Examiner* — J. Brant Murphy

(57) ABSTRACT

Devices and methods of data communication between a first electronic device and a second electronic device are disclosed. The disclosed methods optionally comprises obtaining, at the first electronic device, a base key having a length of N bits; determining, at the first electronic device, a first updated key based on the base key, wherein the first updated key has a length of at least N+M bits, M is larger than 4, and wherein determining the first updated key comprises performing a cryptographic operation, such as a hash function, at least 2M times; and encrypting, at the first electronic device, data with the first updated key for provision of cipher data.

12 Claims, 4 Drawing Sheets

(56) References Cited

U.S. PATENT DOCUMENTS

| | | | | |
|---|---|---|---|---|
| 2006/0078124 A1* | 4/2006 | Whelan | ............... | H04L 63/0457 |
| | | | | 380/273 |
| 2008/0130876 A1* | 6/2008 | Etienne | ..................... | H04L 9/14 |
| | | | | 380/29 |
| 2013/0290734 A1* | 10/2013 | Branton | ................ | H04L 9/0869 |
| | | | | 713/189 |
| 2014/0298013 A1* | 10/2014 | Knudsen | ............. | H04L 63/0428 |
| | | | | 713/167 |
| 2015/0208235 A1* | 7/2015 | Ingale | ............... | H04W 74/0833 |
| | | | | 455/411 |
| 2018/0069699 A1* | 3/2018 | Bowman | ................. | H04L 9/002 |
| 2019/0037454 A1* | 1/2019 | Lee | ................ | H04W 36/00837 |
| 2019/0174311 A1* | 6/2019 | Hayashi | ............... | H04L 9/0866 |
| 2021/0204181 A1* | 7/2021 | Chen | .................. | H04W 12/041 |
| 2022/0053325 A1* | 2/2022 | Hu | ..................... | H04W 12/043 |

FOREIGN PATENT DOCUMENTS

| | | |
|---|---|---|
| WO | 2006051404 | 5/2006 |
| WO | 2009056048 | 5/2009 |

OTHER PUBLICATIONS

XP-002356726—Kaliski B.: Sep. 2000. RFC 2898 (RFC2898) Internet RFC/STD/FYI/BCP Archies. (http://www.faqs.org/frcs/rfc2898.htmt. Nov. 30, 2005.

XP15070809—Krawczyk & Eronen. Internet Engineering Task Force. IBM Research. Nokia. May 2010.

Lee et al: Multiple hashes of single key with passcode for multiple accounts. Faculty of Engineering & Technology. 2007.

* cited by examiner

METHODS AND DEVICES FOR SECURE DATA COMMUNICATION

The present disclosure relates to secure data communication and in particular to a method of data communication between a first electronic device and a second electronic device, and electronic devices therefor.

BACKGROUND

Effectively securing data communication becomes an increasingly vital part of communication systems in particular in view of the increasing computational power and methods for accelerating brute force attacks. With the heavily increasing processing capabilities, the risk of third parties being able to perform successful attacks on data communication is increasing.

SUMMARY

Accordingly, there is a need for improving the security in data communication between electronic devices.

A method of data communication between a first electronic device and a second electronic device is disclosed, the method comprising obtaining, at the first electronic device, a base key having a length of N bits; determining, e.g. at the first electronic device, a first updated key based on the base key; and encrypting, at the first electronic device, data with and/or based on the first updated key for provision of cipher data. The first updated key has a length of at least N+M bits, and M is optionally larger than 4. In the method, determining the first updated key optionally comprises performing a cryptographic operation, such as a hash function and/or an encryption function, at least $2^M$ times.

In one or more exemplary methods, the first updated key has a length of at least N+M bits, M is larger than 4, and determining the first updated key comprises performing a hash function at least $2^M$ times.

Also, a method of data communication between a first electronic device and a second electronic device is disclosed, the method comprises obtaining, at the second electronic device, the cipher data, e.g. from the first electronic device; obtaining, at the second electronic device, a base key having a length of N bits; determining, at the second electronic device, a second updated key based on the base key; and decrypting, at the second electronic device, the cipher data with and/or based on the second updated key for provision of decrypted data. Determining the second updated key optionally comprises performing a cryptographic operation, such as a hash function and/or an encryption function, at least $2^M$ times. In one or more exemplary methods, the second updated key has a length of at least N+M bits, M is larger than 4, and determining the second updated key comprises performing a hash function at least $2^M$ times.

Further, an electronic device (also denoted first electronic device) comprising a processor, memory, and an interface is disclosed, wherein the processor is configured to obtain a base key having a length of N bits; determine a first updated key based on the base key, wherein the first updated key has a length of at least N+M bits, and M is optionally larger than 4; and encrypt data with and/or based on the first updated key for provision of cipher data. To determine the first updated key optionally comprises performing a cryptographic operation, such as a hash function and/or an encryption function, at least $2^M$ times.

In one or more exemplary electronic devices, the first updated key has a length of at least N+M bits, M is larger than 4, and determining the first updated key comprises performing a hash function at least $2^M$ times.

Further, an electronic device (also denoted second electronic device) comprising a processor, memory, and an interface is disclosed, wherein the processor is configured to obtain cipher data; obtain a base key having a length of N bits; determine a second updated key based on the base key, wherein the second updated key has a length of at least N+M bits, M is optionally larger than 4, and wherein determining the second updated key optionally comprises performing a cryptographic operation, such as a hash function and/or an encryption function, at least $2^M$ times; and decrypt the cipher data with and/or based on the second updated key for provision of decrypted data.

It is an important advantage of the present disclosure that improved security in data communication between entities of a communication system is obtained by an increase in the length of the keys used in securing the communication. In particular, the effective length or entropy of a base key is boosted with M additional bits, which heavily increases the security in the communication, e.g. by adding entropy to the updated keys.

The disclosed methods and electronic devices support electronic devices in combatting brute force attacks on data communication.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

Figure 1:
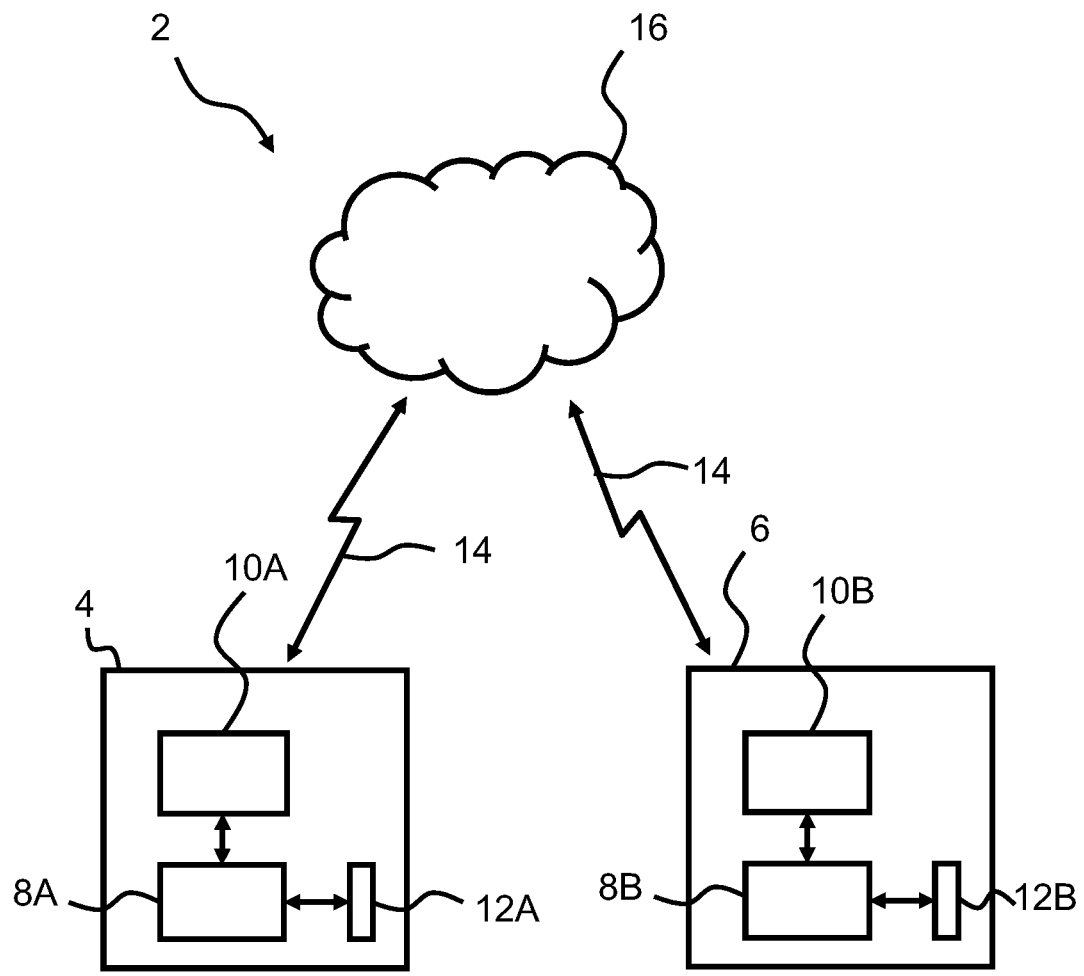
FIG. 1 shows an exemplary communication system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method of data communication between a first electronic device and a second electronic device is disclosed.

The first electronic device may be referred to as the transmitting device. The first electronic device may be configured as a transmitting device and/or a receiving device. The first electronic device may be a portable device, such as a smartphone, a tablet, or a laptop computer. The first electronic device may be a server device. The first electronic device comprises a processor, memory, and an interface.

The second electronic device may be referred to as the receiving device. The second electronic device may be configured as a transmitting device and/or a receiving device. The second electronic device may be a portable device, such as a smartphone, a tablet, or a laptop computer. The second electronic device may be a server device. The second electronic device comprises a processor, memory, and an interface.

The method of data communication between a first electronic device and a second electronic device comprises obtaining, at the first electronic device, a base key also denoted K_B having a length of N bits. In other words, the base key is an N-bit key. The base key may be a 64 bit-key, a 128 bit-key, a 192 bit-key, a 256 bit-key, or a 512 bit-key. Accordingly, the number N of bits in the base key may be larger than 20, such as larger than 50, e.g. in the range from 100 to 500. In one or more exemplary methods/devices, N is at least 64 bits.

The method of data communication between a first electronic device and a second electronic device comprises determining, at the first electronic device, a first updated key also denoted K_1 based on the base key. The first updated key K_1 has a length of at least N+M bits. M is optionally larger than four (4). In one or more exemplary methods and/or (first) electronic devices, M is at least 10, such as 16, 32, 64, 128, 192, or 256. Even larger numbers of M may be used. The first updated key K_1 may have a length of 128, 192, 256, 384, or 512 bits. In one or more exemplary methods and/or (first) electronic devices, the first updated key K_1 has a length of at least 256 bits, such as at least 300 bits. In one or more exemplary methods and/or exemplary (first) electronic devices, M being in the range from 10 to 20, such as in the range from 12 to 18, e.g. 16, has proven to provide an effective increase in the security level while still allowing the cryptographic operations to be performed within an acceptable time frame, such as in less than 1 or 2 seconds. Accordingly, M may be in the range from 10 to 24, such as in the range from 12 to 20, e.g. 16.

In the method and/or in the (first) electronic device, determining the first updated key K_1 optionally comprises performing a key-boosting function, such as non-trivial function, and/or a cryptographic operation, such as a hash function and/or an encryption function, at least $2^M$ times. A combination of hash function and encryption function may be used. In other words, performing a cryptographic operation at least $2^M$ may comprise performing a hash function at least $2^{M-j}$ times and/or performing an encryption function at least $2^j$ times, where j is an integer such as 1, 2, 3 or more.

In the present context, a non-trivial function is a mathematical function that is computationally non-trivial and requires a certain minimum number of operations. Further, the non-trivial function optionally is non-collapsible, i.e. if it takes f operations to do one evaluation of F, it must take about $f*2^M$ operations to compute $F^{2^M}$, i.e. iterate F $2^M$ times. Examples of non-trivial and non-collapsible functions are strong encryption algorithms, such as Serpent and AES, as well as strong hash functions, such as SHA-512 or SHA-3.

In the method and/or in the (first) electronic device, determining the first updated key K_1 optionally comprises iterating a key boosting function F at least $2^M$ times, i.e. K_1=$F^{2^M}$=$F^{2^M}$(K_B)=F(F(F(F( ... F(F(K_B)))) ... ) ($2^M$ times).

The key-boosting function may be a hash function, such as a SHA-2 hash function, e.g. SHA-256, SHA-384, or SHA-512. The key-boosting function may be SHA-3.

The hash function may be a SHA-2 hash function, e.g. SHA-256, SHA-384, or SHA-512. The hash function may be SHA-3.

In the method and/or in the (first) electronic device, determining the first updated key K_1 optionally comprises performing a hash function at least $2^M$ times, such as at least 16 times (M=4). In one or more exemplary methods and/or (first) electronic devices, determining the first updated key comprises performing a nested hash function at least $2^M$ times. In other words, the hash function may be iterated at least $2^M$ times.

In one or more exemplary methods and/or exemplary (first) electronic devices, determining the first updated key K_1 comprises:
  1: i=0 and K_I=K_B
  2: K_I=H(K_I)
  3: i=i+1
  4: if i<$2^M$ then go to 2: else K_1=K_I,
where i and M are integers, K_I is an intermediate key, K_B is the base key, H is a hash function, such as SHA-512, and K_1 is the first updated key.

In one or more exemplary methods and/or exemplary (first) electronic devices, determining the first updated key K_1 comprises:
  1: i=0 and K_I=K_B
  2: K_I=F(K_I)
  3: i=i+1
  4: if i<$2^M$ then go to 2: else K_1=K_I,
where i and M are integers, K_I is an intermediate key, K_B is the base key, F is constructed from AES, e.g. AES in CBC mode, and K_1 is the first updated key.

The method of data communication between a first electronic device and a second electronic device comprises encrypting, at the first electronic device, data with the first updated key for provision of cipher data.

In one or more exemplary methods and/or (first) electronic devices, encrypting data with the first updated key comprises performing a first encryption scheme on the data, e.g. based on a first part and/or a second part of the first updated key, for provision of a first output. In other words, the first part and/or the second part of the first updated key may be used in a first encryption scheme, e.g. 256-bit AES encryption, for provision of a first output. In other words, 256 bits of the first updated key may be the first part of the first updated key and be used in AES 256-bit encryption as the first encryption scheme.

In one or more exemplary methods and/or (first) electronic devices, encrypting data with the first updated key comprises performing a second encryption scheme on the first output, e.g. based on first part and/or second part of the first updated key, for provision of encrypted data. In other words, the second part of the first updated key may be used in a second encryption scheme for provision of encrypted data/cipher data. The second encryption scheme may be based on one or more S-boxes, such as at least 8 S-boxes. One or more S-boxes of an exemplary second encryption scheme may be based on the second part of the first updated key.

In one or more exemplary methods and/or (first) electronic devices, the first part of the first updated key has a first key part length (N_1_1) of at least 64 bits, such as 128 bits, 192 bits, or 256 bits. Thus, the first key part length N_1_1 may be in the range from 100 bits to 500 bits.

In one or more exemplary methods and/or (first) electronic devices, the second part of the first updated key has a second key part length (M_1_2) of at least 10 bits, such as 16, 32, 64, 128, 192, or 256 bits. Thus, the second key part length M_1_2 may be in the range from 10 bits to 500 bits.

In one or more exemplary methods and/or (first) electronic devices, the first encryption scheme is the Advanced Encryption Standard (AES). The second encryption scheme may be different from the first encryption scheme.

In one or more exemplary methods and/or (first) electronic devices, the first updated key is based on an index function or an index used as input to the hash function. Thereby cyclic effects in the cryptographic operation, such as the hash function, may be avoided.

In one or more exemplary methods and/or exemplary (first) electronic devices, determining the first updated key K_1 comprises adding K bits to the base key prior to performing the key-boosting function/cryptographic operation. The number K of additional bits may be equal to or larger than M. In one or more exemplary methods and/or exemplary (first) electronic devices, the number K of additional bits may be 16, 32, 64, 128, 192, or 256 bits. In one or more exemplary methods and/or exemplary (first) electronic devices, the additional K bits may be preset to e.g. "0" or "1". In one or more exemplary methods and/or exemplary (first) electronic devices, the value of the K bits may be selected from a look-up table or based on a key agreement protocol (also known to the second electronic device). In one or more exemplary methods and/or exemplary (first) electronic devices, the K bits may be based on a secondary Diffie-Hellman key exchange between the first electronic device and the second electronic device.

For example, in one or more exemplary methods and/or exemplary (first) electronic devices, determining the first updated key K_1 comprises:

1: i=0 and K_I=K_B
2: K_I=H(K_I+i)
3: i=i+1
4: if i<$2^M$ then go to 2: else K_1=K_I, where i and M are integers, K_I is an intermediate key, K_B is the base key, H is a hash function, and K_1 is the first updated key. In other words, the hash function H, and therefore the first updated key K_1 is based on the index function i.

In one or more exemplary methods and/or (first) electronic devices, obtaining a base key having a length of N bits comprises key exchange between the first electronic device and the second electronic device, such as Diffie-Hellman key exchange between the first electronic device and the second electronic device. In other words, the base key may be a Diffie-Hellman key. Other key exchange methods may be employed.

In one or more exemplary methods and/or (first) electronic devices, the method comprises transmitting, at the first electronic device, the cipher data, e.g. to the second electronic device. In one or more exemplary methods and/or (first) electronic devices, the method comprises storing the cipher data in the memory of the first electronic device.

In one or more exemplary methods, the method comprises obtaining, e.g. at the second electronic device, the cipher data; obtaining, e.g. at the second electronic device, the base key having a length of N bits; determining, e.g. at the second electronic device, a second updated key based on the base key; and decrypting, e.g. at the second electronic device, the cipher data with and/or based on the second updated key for provision of decrypted data.

The second updated key has a length of at least N+M bits. M is optionally larger than four (4). In one or more exemplary methods and/or (second) electronic devices, M is at least 10, such as 16, 32, 64, 128, 192, or 256. Even larger numbers of M may be used. The second updated key K_2 may have a length of 128, 192, 256, 384, or 512 bits. In one or more exemplary methods and/or (second) electronic devices, the second updated key K_2 has a length of at least 256 bits, such as at least 300 bits.

In the method and/or in the (second) electronic device, determining/to determine the second updated key optionally comprises performing a key-boosting function, such as non-trivial function, and/or a cryptographic operation, such as a hash function and/or an encryption function, at least $2^M$ times. A combination of hash function and encryption function may be used. In other words, performing a cryptographic operation at least $2^M$ times may comprise performing a hash function at least $2^{M-j}$ times and/or performing an encryption function at least $2^j$ times, where j is an integer such as 1, 2, 3 or more. In one or more exemplary methods and/or exemplary (second) electronic devices, M being in the range from 10 to 20, such as in the range from 12 to 18, e.g. 16, has proven to provide an effective increase in the security level while still allowing the cryptographic operations to be performed within an acceptable time frame, such as in less than 1 or 2 seconds. Accordingly, M may be in the range from 10 to 24, such as in the range from 12 to 20, e.g. 16.

In the method and/or in the (second) electronic device, determining the second updated key K_2 optionally comprises iterating a key boosting function F at least $2^M$ times, i.e. K_1=F^$2^M$=F^$2^M$(K_B)=F(F(F( . . . F(F(K_B)))) . . . ) ($2^M$ times). The key-boosting function may be a SHA-2 hash function, e.g. SHA-256, SHA-384, or SHA-512. The key-boosting function may be SHA-3.

In the method and/or in the (second) electronic device, determining the second updated key optionally comprises performing a cryptographic operation, such as a hash function and/or an encryption function, at least $2^M$ times, such as at least 16 times (M=4). In one or more exemplary methods and/or (second) electronic devices, determining the second updated key comprises performing a nested hash function at least $2^M$ times. A nested hash function takes as input the output or result of the previous hash function.

In one or more exemplary methods and/or exemplary (second) electronic devices, determining the second updated key K_2 comprises adding K bits to the base key prior to performing the key-boosting function/cryptographic operation. The number K of additional bits may be equal to or larger than M. In one or more exemplary methods and/or exemplary (second) electronic devices, the number K of additional bits may be 16, 32, 64, 128, 192, or 256 bits. In one or more exemplary methods and/or exemplary (second) electronic devices, the additional K bits may be preset to e.g. "0" or "1". In one or more exemplary methods and/or exemplary (first) electronic devices, the value of the K bits may be selected from a look-up table or based on a key agreement protocol (also known to the second electronic device). In one or more exemplary methods and/or exemplary (first) electronic devices, the K bits may be based on a secondary Diffie-Hellman key exchange between the first electronic device and the second electronic device.

In one or more exemplary methods and/or exemplary (second) electronic devices, determining the second updated key K_2 comprises:

1: i=0 and K_I=K_B
2: K_I=H(K_I)
3: i=i+1
4: if i<$2^M$ then go to 2: else K_2=K_I, where i and M are integers, K_I is an intermediate key, K_B is the base key, H is a hash function, and K_2 is the second updated key.

In one or more exemplary methods and/or exemplary (second) electronic devices, determining the second updated key K_2 comprises:
1: i=0 and K_I=K_B
2: K_I=F(K_I)
3: i=i+1
4: if i<$2^M$ then go to 2: else K_2=K_I, where i and M are integers, K_I is an intermediate key, K_B is the base key, F is constructed from AES, e.g. AES in CBC mode, and K_2 is the second updated key.

In one or more exemplary methods and/or (second) electronic devices, the second updated key is based on an index function or an index used as input to the hash function. Thereby cyclic effects in the cryptographic operation, e.g. the hash function, may be avoided.

For example, in one or more exemplary methods and/or exemplary (second) electronic devices, determining the second updated key K_2 comprises:
1: i=0 and K_I=K_B
2: K_I=H(K_I+i)
3: i=i+1
4: if i<$2^M$ then go to 2: else K_2=K_I, where i and M are integers, K_I is an intermediate key, K_B is the base key, H is a hash function, and K_2 is the second updated key. In other words, the hash function H, and therefore the second updated key K_2 is based on the index function i.

Decrypting the cipher data with and/or based on the second updated key optionally comprises performing a second decryption scheme on the cipher data, e.g. based on a first part and/or second part of the second updated key, for provision of a second output, and performing a first decryption scheme on the second output, e.g. based on a first part and/or a second part of the second updated key, for provision of decrypted data. Thus, the second electronic device reproduces the data originally obtained in the first electronic device.

The second decryption scheme may be based on one or more S-boxes, such as at least 8 S-boxes. One or more S-boxes of an exemplary second encryption scheme may be based on the second part of the second updated key.

The first decryption scheme may be the Advanced Encryption Standard (AES), e.g. 256-bit AES decryption. The second decryption scheme may be different from the first decryption scheme. It is to be understood that the first decryption scheme is used to decrypt data encrypted by the first encryption scheme and that the second decryption scheme is used to decrypt data encrypted with the second encryption scheme.

In one or more exemplary methods and/or (first and/or second) electronic devices, the first part of the second updated key has a first key part length (N_2_1) of at least 64 bits, such as 128 bits, 192 bits, or 256 bits. Thus, the first key part length N_2_1 may be in the range from 100 bits to 500 bits. Thus, 256 bits of the second updated key may be the first part of the second updated key and be used in AES 256-bit decryption as the first decryption scheme.

In one or more exemplary methods and/or (first) electronic devices, the second part of the second updated key has a second key part length (M_2_2) of at least 10 bits, such as 16, 32, 64, 128, 192, or 256 bits. Thus, the second key part length M_2_2 may be in the range from 10 bits to 500 bits.

In one or more exemplary methods and/or exemplary (first and/or second) electronic devices, the base key is a 256-bit key (N=256) and the cryptographic operation is performed $2^{16}$ (M=16) times or more, thus providing an updated key with 16 additional bits of entropy, i.e. a total of 256+16=272 bits of entropy. The length of the updated keys may be larger than the entropy of the updated keys. For example, the first and second updated keys may have a length of more than N+M bits, e.g. a length of 384 bits or 512 bits with an entropy in the range from 266 bits to 276, e.g. a 272 bit entropy.

In one or more exemplary methods and/or exemplary (first and/or second) electronic devices, the base key is a 256-bit key (N=256), the cryptographic operation, such as the hash function or an AES function, is performed $2^{16}$ (M=16) times, and the length of the first updated key and the second updated key is larger than 300 bits, e.g. in the range from 320 bits to 400 bits or from 500 bits to 550 bits.

Electronic devices, such as electronic devices are disclosed. The interface of an electronic device may comprise a wireless transceiver configured for wireless communication, e.g. in order to communicate cipher data and/or obtain the base key.

FIG. 1 shows a communication system 2 comprising a first electronic device 4 and a second electronic device 6. The first electronic device 4 comprises a processor 8A, memory 10A, and an interface 12A. Cipher data 14 are communicated from the first electronic device (transmitting device) 4 to the second electronic device (receiving device) 6 via network 16. The first electronic device 4 may be wired and/or wirelessly connected to the network 16. The second electronic device 6 may be wired and/or wirelessly connected to the network 16.

Figure 2:
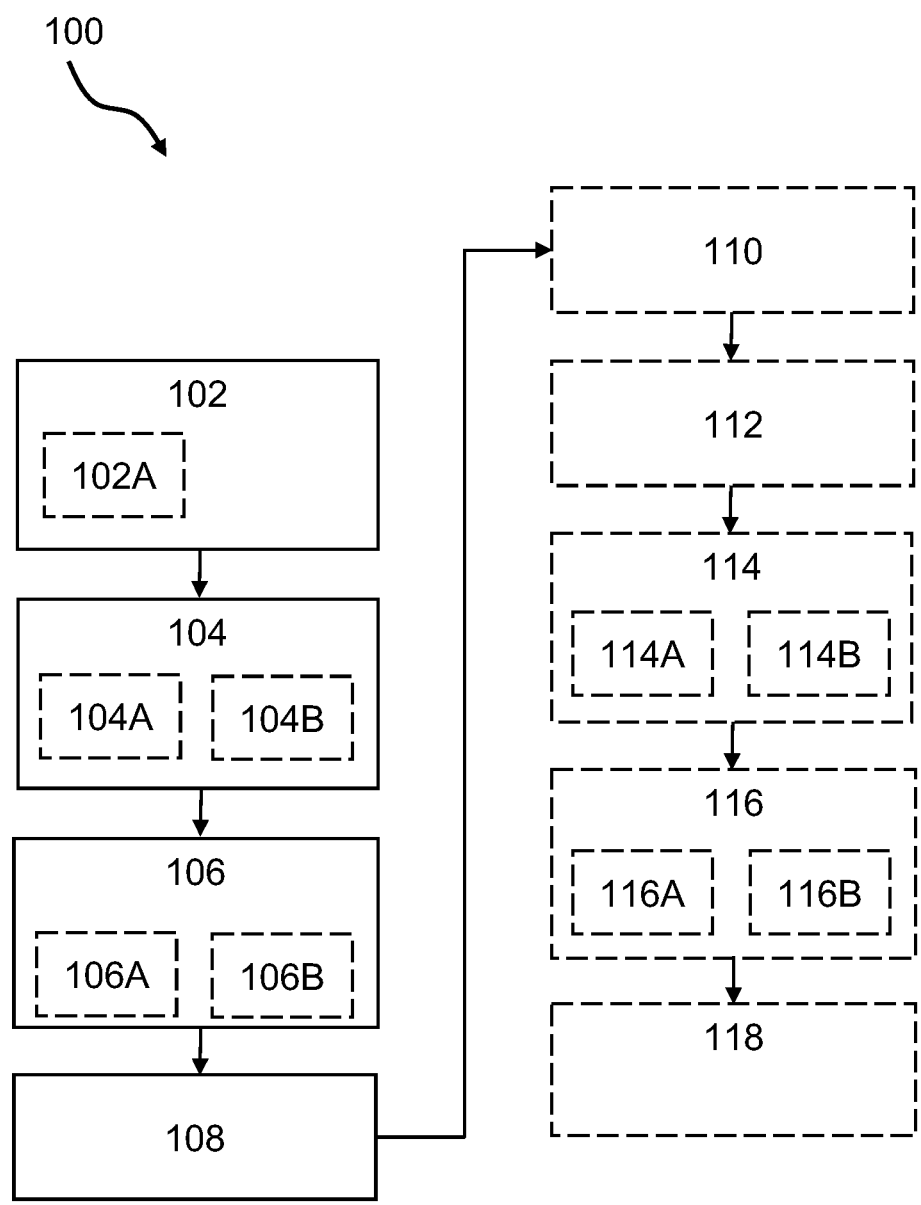
FIG. 2 is a flow chart of an exemplary method.

FIG. 2 shows a flow chart of an exemplary method of data communication between a first electronic device, e.g. first electronic device 4, and a second electronic device, e.g. second electronic device 6. The method 100 comprises obtaining 102, at the first electronic device, a base key having a length of N bits, such as 256 bits. Obtaining a base key having a length of N bits optionally comprises Diffie-Hellman key exchange 102A between the first electronic device and the second electronic device.

The method 100 proceeds to determining 104, at the first electronic device, a first updated key based on the base key. Determining 104 a first updated key based on the base key comprises performing 104A, e.g. including nesting and/or iterating, a hash function, such as SHA-512, at least $2^M$ times. In other words, the base key is used as input to the (first run-time of) hash function. The first updated key may be based on an index function used as input to the hash function. For example, an integer index may be fed to the hash function as an input. The integer index may be incremented every time the hash function is performed. Accordingly, determining 104 a first updated key based on the base key may comprise incrementing 104C an integer index, e.g. prior to or after application of the hash function.

Upon determining the first updated key, the method 100 comprises encrypting 106, e.g. at the first electronic device, data with and/or based on the first updated key for provision of cipher data. Encrypting 106 data with and/or based on the first updated key for provision of cipher data optionally comprises performing 106A a first encryption scheme, e.g. AES encryption, on the data based on a first part of the first updated key for provision of a first output and optionally performing 106B a second encryption scheme, optionally different from the first encryption scheme, on the first output based on a second part of the first updated key for provision of cipher data. The first part of the first updated key has a first key part length N_1_1 of at least 64 bits, such as 128, 192, or 256 bits, and the second part of the first updated key has a second key part length M_1_2 of at least 10 bits, such as 128 bits.

The method 100 may comprise transmitting 108, at the first electronic device, the cipher data, e.g. to the second electronic device.

The method 100 optionally comprises obtaining 110, e.g. at the second electronic device, the cipher data; obtaining 112, e.g. at the second electronic device, the base key having a length of N bits; determining 114, e.g. at the second electronic device, a second updated key based on the base key; and decrypting 116, e.g. at the second electronic device, the cipher data with and/or based on the second updated key for provision of decrypted data. The second updated key has a length of at least N+M bits. M is optionally larger than four (4). In one or more exemplary methods and/or (second) electronic devices, M is at least 10, such as 16, 32, 64, 128, 192, or 256. Even larger numbers of M may be used. Determining the second updated key optionally comprises performing 114A, e.g. including nesting and/or iterating, a hash function at least $2^M$ times, such as at least 16 times (M=4). In one or more exemplary methods and/or (second) electronic devices, determining the second updated key comprises performing 114B a nested hash function at least $2^M$ times.

In method 100, decrypting 116 the cipher data with and/or based on the second updated key comprises performing 116A a second decryption scheme on the cipher data, e.g. based on a second part of the second updated key for provision of a second output, and performing 116B a first decryption scheme on the second output based on a first part of the second updated key for provision of decrypted data. The first part of the second updated key has a first key part length N_2_1 of at least 64 bits, e.g. 256 bits, and the second part of the second updated key has a second key part length M_2_2 of at least 10 bit, such as 128 bits.

The method 100 optionally comprises outputting 118 the decrypted data, e.g. by displaying the decrypted data on a display of the interface (second electronic device) and/or storing the decrypted data in the memory of the second electronic device. In one or more exemplary methods, outputting the decrypted data comprises determining and outputting an audio signal based on the decrypted data via a loudspeaker of the interface of the second electronic device.

Figure 3:
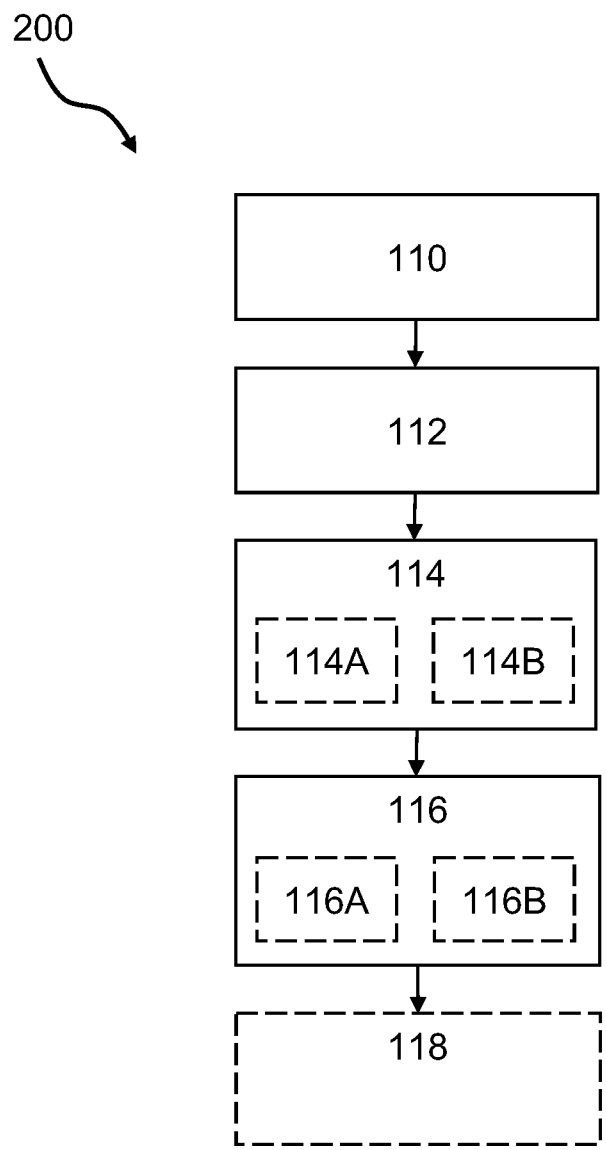
FIG. 3 is a flow chart of an exemplary method.

FIG. 3 shows a flow chart of an exemplary method of data communication between a first electronic device, e.g. first electronic device 4, and a second electronic device, e.g. second electronic device 6. The method 200 comprises obtaining 110, e.g. at the second electronic device, cipher data; obtaining 112, e.g. at the second electronic device, a base key having a length of N bits; determining 114, e.g. at the second electronic device, a second updated key based on the base key; and decrypting 116, e.g. at the second electronic device, the cipher data with and/or based on the second updated key for provision of decrypted data. The second updated key has a length of at least N+M bits. M is optionally larger than four (4). In one or more exemplary methods and/or (second) electronic devices, M is at least 10, such as 16, 32, 64, 128, 192, or 256. Even larger numbers of M may be used. Determining the second updated key optionally comprises performing 114A a hash function at least $2^M$ times, such as at least 16 times (M=4). In one or more exemplary methods and/or (second) electronic devices, determining the second updated key comprises performing 114B a nested hash function at least $2^M$ times.

Figure 4:
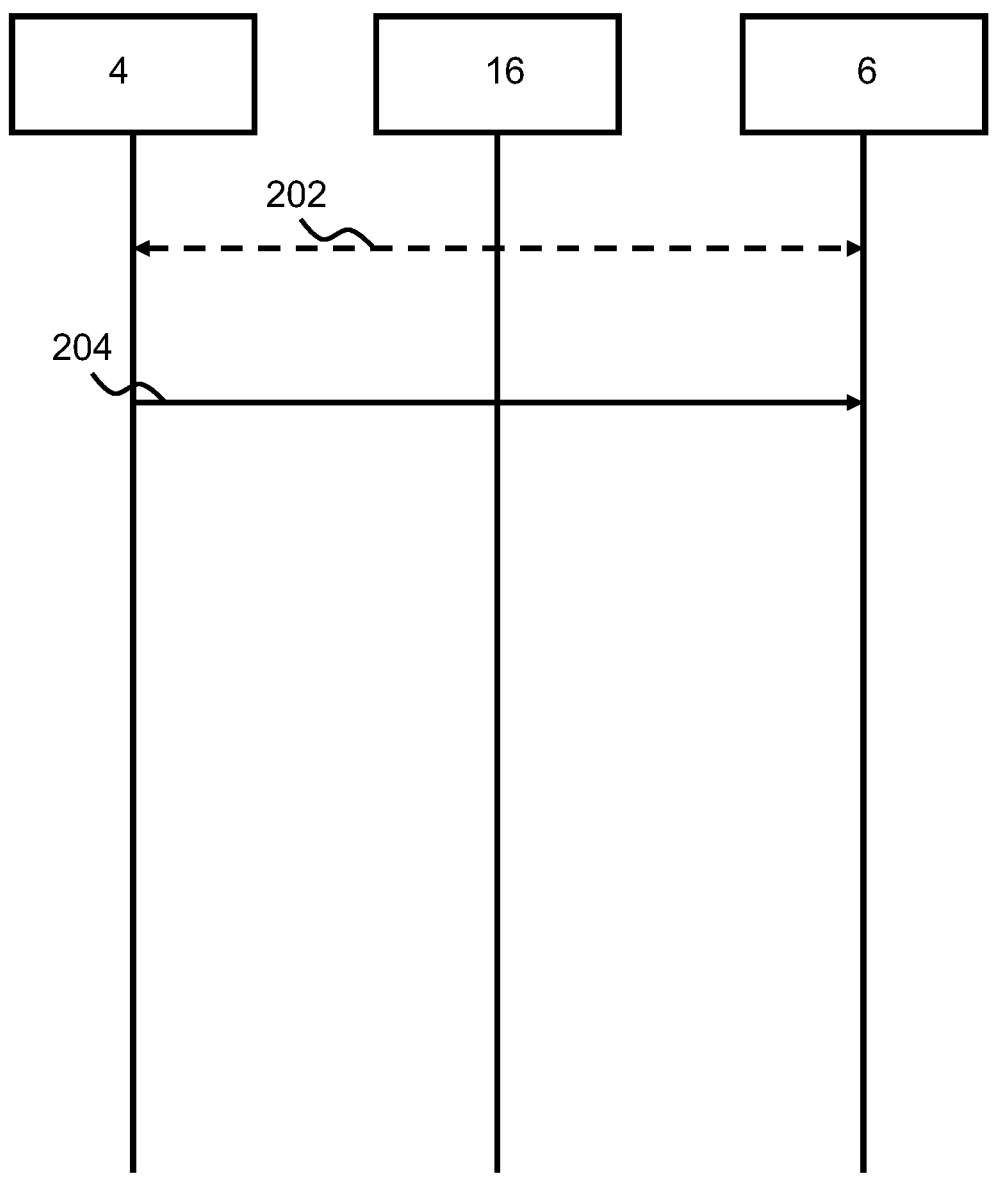
FIG. 4 illustrates signaling between a first electronic device and a second electronic device.

FIG. 4 illustrates data communication between first electronic device 4 and second electronic device 6, e.g. via network 16. The first electronic device 4 and the second electronic device obtains a base key by Diffie-Hellman key exchange 202. The first electronic device 4 determines a first updated key as described herein and encrypts data with and/or based on the first updated key to provide cipher data that is transmitted from the first electronic device to the second electronic device by cipher data transmission 204.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-4 comprise some circuitries or operations/method steps which are illustrated with a solid line and some circuitrys or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps or processes, which may be implemented in one aspect by a computer program product, embodied in a computer-readable medium, including computer-executable instructions, such as program code, executed by computers in networked environments. A computer-readable medium or memory may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are accordingly to be regarded in an illustrative rather than restrictive sense. The claimed disclosure is intended to cover all alternatives, modifications, and equivalents.

LIST OF REFERENCES 2 communication system
4 first electronic device
6 second electronic device
8A processor of first electronic device
8B processor of second electronic device
10A memory of first electronic device
10B memory of second electronic device
12A interface of first electronic device
12B interface of second electronic device
14 cipher data
16 network
100, 200 method of data communication between a first electronic device and a second electronic device
102 obtaining, at the first electronic device, a base key having a length of N bits
102A Diffie-Hellman key exchange
104 determining, at the first electronic device, a first updated key based on the base key
104A performing a cryptographic operation, such as a hash function, at least $2^M$ times
104B performing a nested hash function at least $2^M$ times
106 encrypting, at the first electronic device, data with the first updated key for provision of cipher data
106A performing a first encryption scheme on the data
106B performing a second encryption scheme on first output
108 transmitting the cipher data to the second electronic device
110 obtaining, at the second electronic device, the cipher data
112 obtaining, at the second electronic device, the base key having a length of N bits
114 determining, at the second electronic device, a second updated key based on the base key
114A performing a cryptographic operation, such as a hash function, at least $2^M$ times
114B performing a nested hash function at least $2^M$ times
116 decrypting, at the second electronic device, the cipher data with the second updated key for provision of decrypted data
116A performing a second decryption scheme on the cipher data for provision of a second output
116B performing 116B a first decryption scheme on the second output for provision of decrypted data
118 outputting the decrypted data
202 Diffie-Hellman key exchange
204 transmission of cipher data

The invention claimed is:

1. A method of data communication between a first electronic device and a second electronic device, the method comprising:
obtaining, at the first electronic device, a base key having a length of N bits;
determining, at the first electronic device, a first updated key based on the base key, wherein the first updated key has a length of at least N+M bits, M is larger than 4, and wherein determining the first updated key comprises performing a cryptographic operation at least $2^M$ times; and
encrypting, at the first electronic device, data with the first updated key for provision of cipher data, wherein encrypting data with the first updated key comprises performing a first encryption scheme on the data based on a first part of the first updated key for provision of a first output and performing a second encryption scheme on the first output based on a second part of the first updated key for provision of cipher data.

2. Method according to claim 1, wherein the cryptographic operation is or comprises a hash function, and wherein N is at least 64 and M is at least 10.

3. Method according to claim 1, wherein determining the first updated key comprises performing a nested hash function at least $2^M$ times.

4. Method according to claim 1, wherein the first part of the first updated key has a first key part length of at least 64 bits and the second part of the first updated key has a second key part length of at least 10 bits.

5. Method according to claim 1, wherein the first encryption scheme is the Advanced Encryption Standard (AES).

6. Method according to claim 1, wherein the second encryption scheme is different from the first encryption scheme.

7. Method according to claim 1, wherein the first updated key is based on an index function used as input to the hash function.

8. Method according to claim 1, wherein obtaining a base key having a length of N bits comprises Diffie-Hellman key exchange between the first electronic device and the second electronic device.

9. An electronic device comprising a processor, memory, and an interface, wherein the processor is configured to:
obtain a base key having a length of N bits;
determine a first updated key based on the base key, wherein the first updated key has a length of at least N+M bits, M is larger than 4, and wherein determining the first updated key comprises performing a cryptographic operation at least $2^M$ times; and
encrypt data with the first updated key for provision of cipher data, wherein encrypting data with the first updated key comprises performing a first encryption scheme on the data based on a first part of the first updated key for provision of a first output and performing a second encryption scheme on the first output based on a second part of the first updated key for provision of cipher data.

10. A method of data communication between a first electronic device and a second electronic device, the method comprising:
obtaining, at the first electronic device, a base key having a length of N bits;
determining, at the first electronic device, a first updated key based on the base key, wherein the first updated key has a length of at least N+M bits, M is larger than 4, and wherein determining the first updated key comprises performing a cryptographic operation at least $2^M$ times;
encrypting, at the first electronic device, data with the first updated key for provision of cipher data;
transmitting, at the first electronic device, the cipher data to the second electronic device;
obtaining, at the second electronic device, the cipher data;
obtaining, at the second electronic device, the base key having a length of N bits;

determining, at the second electronic device, a second updated key based on the base key, wherein the second updated key has a length of at least N+M bits, M is larger than 4, and wherein determining the second updated key comprises performing a cryptographic operation at least $2^M$ times; and decrypting, at the second electronic device, the cipher data with the second updated key for provision of decrypted data.

11. Method according to claim 10, wherein decrypting the cipher data with the second updated key comprises performing a second decryption scheme on the cipher data based on a second part of the second updated key for provision of a second output and performing a first decryption scheme on the second output based on a first part of the second updated key for provision of decrypted data.

12. Method according to claim 11, wherein the first part of the second updated key has a first key part length of at least 64 bits and the second part of the second updated key has a second key part length of at least 10 bits.

* * * * *